US00RE50850E

(19) United States
(12) Reissued Patent
Han et al.

(10) Patent Number: US RE50,850 E
(45) Date of Reissued Patent: *Mar. 31, 2026

(54) DISPLAY APPARATUS FOR PERFORMING VOICE CONTROL AND VOICE CONTROLLING METHOD THEREOF

(71) Applicant: SAMSUNG ELECTRONICS CO., LTD., Suwon-si (KR)

(72) Inventors: Sang-jin Han, Gunpo-si (KR); Eun-hee Park, Guri-si (KR)

(73) Assignee: SAMSUNG ELECTRONICS CO., LTD., Suwon-si (KR)

( * ) Notice: This patent is subject to a terminal disclaimer.

(21) Appl. No.: 17/175,261

(22) Filed: Feb. 12, 2021

Related U.S. Patent Documents

Reissue of:
(64) Patent No.: 9,711,149
Issued: Jul. 18, 2017
Appl. No.: 14/515,781
Filed: Oct. 16, 2014

U.S. Applications:
(63) Continuation of application No. 16/515,466, filed on Jul. 18, 2019, now abandoned, which is an application for the reissue of Pat. No. 9,711,149.

(30) Foreign Application Priority Data

Jan. 27, 2014 (KR) ..... 10-2014-0009388

(51) Int. Cl.
*G10L 15/22* (2006.01)
*G06F 3/16* (2006.01)
(Continued)

(52) U.S. Cl.
CPC ..... *G10L 17/22* (2013.01); *G06F 3/167* (2013.01); *G10L 15/26* (2013.01);
(Continued)

(58) Field of Classification Search
CPC ..... G06F 3/167; G10L 15/1815; G10L 15/26; G10L 17/22; G10L 2015/223; H04N 21/42203
See application file for complete search history.

(56) References Cited

U.S. PATENT DOCUMENTS 5,774,859 A * 6/1998 Houser ..... G10L 15/26 348/E5.103
9,129,011 B2 9/2015 Yang
(Continued)

FOREIGN PATENT DOCUMENTS

EP 2182452 A1 5/2010
EP 2474973 A1 7/2012
(Continued)

OTHER PUBLICATIONS

Abdeen et al., "An architecture for multi-lingual hands-free desktop control system for PC windows", May 7, 2008, IEEE, 2008 Canadian Conference on Electrical and Computer Engineering. (Year: 2008).*

(Continued)

*Primary Examiner* — William H. Wood
(74) *Attorney, Agent, or Firm* — Sughrue Mion, PLLC

(57) ABSTRACT

A display apparatus and a voice controlling method thereof are provided. The voice controlling method includes receiving a voice of a user; converting the voice into text; and sequentially changing and applying a plurality of different determination criteria to the text until a control operation corresponding to the text is determined; and performing the determined control operation to control the display apparatus.

11 Claims, 16 Drawing Sheets

(51) Int. Cl.

| | |
|---|---|
| ***G10L 15/26*** | (2006.01) |
| ***G10L 17/22*** | (2013.01) |
| ***H04N 21/422*** | (2011.01) |
| *G10L 15/18* | (2013.01) |

(52) U.S. Cl.
CPC ... *H04N 21/42203* (2013.01); *G10L 15/1815* (2013.01); *G10L 2015/223* (2013.01)

(56) References Cited

U.S. PATENT DOCUMENTS

| | | | | |
|---|---|---|---|---|
| 9,219,949 | B2 | 12/2015 | Heo et al. | |
| 2004/0260562 | A1* | 12/2004 | Kujirai | G01C 21/3679 704/E15.044 |
| 2007/0282611 | A1 | 12/2007 | Kaneko et al. | |
| 2008/0136972 | A1 | 6/2008 | Blankenburg | |
| 2009/0054003 | A1 | 2/2009 | Lee | |
| 2010/0105364 | A1 | 4/2010 | Yang | |
| 2012/0245945 | A1* | 9/2012 | Miyauchi | G10L 15/06 704/E11.001 |
| 2012/0259639 | A1* | 10/2012 | Yeh | G06F 3/04842 704/E15.001 |
| 2013/0035941 | A1* | 2/2013 | Kim | G06F 3/017 704/275 |
| 2013/0041665 | A1* | 2/2013 | Jang | H04N 21/482 704/E15.001 |
| 2013/0124953 | A1* | 5/2013 | Fan | G06F 17/212 715/202 |
| 2013/0179173 | A1 | 7/2013 | Lee et al. | |
| 2013/0218572 | A1* | 8/2013 | Cho | G10L 15/22 704/E21.001 |
| 2013/0339020 | A1 | 12/2013 | Heo et al. | |
| 2014/0122059 | A1* | 5/2014 | Patel | G06F 17/30017 704/9 |
| 2014/0188486 | A1* | 7/2014 | You | G06F 3/167 704/275 |
| 2015/0106090 | A1* | 4/2015 | Choi | G10L 15/28 704/235 |
| 2015/0127353 | A1* | 5/2015 | Cho | G06F 3/167 704/275 |
| 2015/0332664 | A1* | 11/2015 | Hendricks | G09B 5/065 704/260 |
| 2019/0279636 | A1* | 9/2019 | Woodall | G06F 3/017 |

FOREIGN PATENT DOCUMENTS

| | | | | |
|---|---|---|---|---|
| EP | 2533242 | A1 | 12/2012 | |
| EP | 2610863 | A2 | 7/2013 | |
| JP | 2000-242464 | A | 9/2000 | |
| JP | 2002-156991 | A | 5/2002 | |
| KR | 10-2009-0020897 | A | 2/2009 | |
| KR | 10-2010-0047719 | A | 5/2010 | |
| KR | 10-2011-0030947 | A | 3/2011 | |
| KR | 10-2013-0140423 | A | 12/2013 | |
| WO | WO-0021232 | A2 * | 4/2000 | G06F 17/30899 |

OTHER PUBLICATIONS

Communication dated May 18, 2020, issued by the Korean Intellectual Property Office in corresponding Korean Application No. 10-2014-0009388.

Communication dated Oct. 28, 2016, issued by the European Patent Office in counterpart European Patent Application No. 15152749.6.

Extended European Search Report dated May 19, 2015, issued by the European Patent Office in counterpart European Application No. 15152749.6.

Office Action issued in parent U.S. Appl. No. 16/515,466 mailed Jul. 14, 2020.

Final Office Action issued in parent U.S. Appl. No. 16/515,466 mailed Dec. 8, 2020.

Communication dated May 19, 2015, issued by the European Patent Office in counterpart European Application No. 15152749.6.

* cited by examiner

DISPLAY APPARATUS FOR PERFORMING VOICE CONTROL AND VOICE CONTROLLING METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for the reissue of U.S. Pat. No. 9,711,149. The reissue applications are the present application and U.S. application Ser. No. 16/515,466. U.S. application Ser. No. 16/515,466, filed on Jul. 18, 2019, is a reissue of U.S. Pat. No. 9,711,149, which was filed as U.S. application Ser. No. 14/515,781 on Oct. 16, 2014 and issued on Jul. 18, 2017, the disclosures of which are incorporated herein by reference in their entirety. The present application is a continuation reissue of U.S. application Ser. No. 16/515,466 filed on Jul. 18, 2019 and a reissue of U.S. Pat. No. 9,711,149.*

CROSS-REFERENCE TO RELATED APPLICATION(S)

This application claims priority from Korean Patent Application No. 10-2014-0009388, filed on Jan. 27, 2014, in the Korean Intellectual Property Office, the disclosure of which is incorporated herein by reference in its entirety.

BACKGROUND

1. Field

Methods and devices of manufacture consistent with exemplary embodiments relate to a display apparatus and a voice controlling method thereof, and more particularly, to a display apparatus for determining a voice input of a user to perform an operation and a voice controlling method thereof.

2. Description of the Related Art

As display apparatuses have been gradually becoming more multifunctional and advanced, various input methods for controlling the display apparatuses have been developed. For example, an input method using a voice control technology, an input method using a mouse, an input method using a touch pad, an input method using a motion sensing remote controller, etc. have been developed.

However, there are several kinds of disadvantages in using voice control technology. For example, if a voice uttered by a user is a simple keyword having no verb, a different operation from that intended by the user may be performed.

In other words, if the display apparatus misrecognizes the voice uttered by the user, the display apparatus may not be controlled as the user wants.

SUMMARY

Exemplary embodiments address at least the above disadvantages and other disadvantages not described above. Also, the exemplary embodiments are not required to overcome the disadvantages described above, and an exemplary embodiment may not overcome any of the disadvantages described above.

One or more exemplary embodiments provide a display apparatus for determining a voice input of a user to perform an operation corresponding to an intention of the user and a method of controlling a voice.

According to an aspect of an exemplary embodiment, there is provided a voice controlling method of a display apparatus, the method including: receiving a voice of a user; converting the voice into text; sequentially changing and applying a plurality of different determination criteria to the text until a control operation corresponding to the text is determined; and performing the determined control operation to control the display apparatus.

The sequentially changing and applying the plurality of different determination criteria may include determining whether the text corresponds to a title of an object displayed on a screen of the display apparatus; and in response to determining that the text corresponds to the title of the object, determining an operation corresponding to the object as the control operation.

The determining whether the text corresponds to the title of the object may include, in response to a part of the title of the object being displayed and the text corresponding to at least a portion of the displayed part of the object, determining that the text corresponds to the title of the object.

The determining whether the text corresponds to the title of the object may include, in response to only a part of one word included in the title of the object being displayed and the text corresponding to the whole one word, determining that the text corresponds to the title of the object.

The object may include at least one of a content title, an image title, a text icon, a menu name, and a number that are displayed on the screen.

The sequentially changing and applying the plurality of different determination criteria may further include: in response to determining that the text does not correspond to the title of the object, determining whether the text corresponds to a stored command; and in response to determining that the text corresponds to the stored command, determining an operation corresponding to the stored command as the control operation.

The stored command may include at least one of a command for controlling power of the display apparatus, a command for controlling a channel of the display apparatus, and a command for controlling a volume of the display apparatus.

The sequentially changing and applying the plurality of different determination criteria may include: in response to determining that the text does not correspond to the stored command, determining whether a meaning of the text is analyzable; and in response to determining that the meaning of the text is analyzable, analyzing the meaning of the text and determining an operation of displaying a response message corresponding to the analysis result as the control command.

The sequentially changing and applying the plurality of different determination criteria may include in response to determining that the meaning of the text is not analyzable, determining an operation of a search using the text as a keyword, as the control operation.

According to an aspect of another exemplary embodiment, there is provided a display apparatus including: a voice input circuit configured to receive a voice of a user; a voice converter configured to convert the voice into text; a storage configured to store a plurality of determination criteria that are different from one another; and a controller configured to sequentially change and apply a plurality of different determination criteria to the text until a control operation corresponding to the text is determined, and perform the determined control operation.

The controller may be configured to sequentially change and apply the plurality of different determination criteria to the text by determining whether the text corresponds to a title of an object displayed on a screen of the display apparatus and, in response to determining that the text corresponds to the title of the object, determining an operation corresponding to the object as the control operation.

The controller may be configured to, in response to only a part of the title of the object being displayed and determining that the text corresponds to the part of the title of the object being displayed, determine that the text corresponds to the title of the object.

The controller may be configured to, in response to only a part of one word included in the title of the object being displayed and determining that the text corresponds to the whole one word, determine that the text corresponds to the title of the object.

The object may include at least one of a content title, an image title, a text icon, a menu name, and a number that are displayed on the screen.

The controller may be configured to sequentially change and apply the plurality of different determination criteria to the text by, in response to determining that the text does not correspond to the title of the object, determining whether the text corresponds to a stored command, and in response to determining that the text corresponds to the stored command, determining an operation corresponding to the stored command as the control operation.

The stored command may include at least one of a command for controlling power of the display apparatus, a command for controlling a channel of the display apparatus, and a command for controlling a volume of the display apparatus.

The controller may be configured to sequentially change and apply the plurality of different determination criteria to the text by, in response to determining that the text does not correspond to the stored command, determining whether a meaning of the text is analyzable, and, in response to determining that the meaning of the text is analyzable, analyzing the meaning of the text and determines an operation of displaying a response message corresponding to the analysis result, as the control operation.

The controller may be configured to sequentially change and apply the plurality of different determination criteria to the text by, in response to determining that the meaning of the text is not analyzable, determining an operation of a search using the text as a keyword, as the control operation.

The plurality of different determination criteria may include criteria of whether the text corresponds to a title of a displayed object, whether the text corresponds to a stored command, whether the text is grammatically analyzable, and whether the text refers to a keyword.

According to an aspect of another exemplary embodiment, there may be provided a voice controlling method of a display apparatus, the voice controlling method including receiving a voice of a user; converting the voice into text; applying at least two tiers of hierarchical criteria the text to determine a control operation corresponding to the text; and controlling the display apparatus according to the determined control operation.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
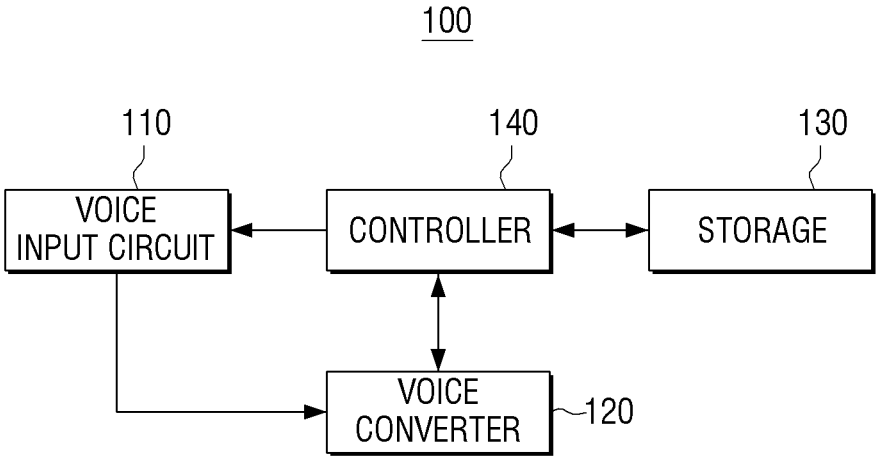
FIG. 1 is a block diagram illustrating a structure of a display apparatus according to an exemplary embodiment.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a block diagram illustrating a structure of a display apparatus according to an exemplary embodiment. Referring to FIG. 1, a display apparatus 100 includes a voice input circuit 110, a voice converter 120, a controller 140, and a storage 130.

The display apparatus 100 may receive a voice of a user through the voice input circuit 110 and convert the voice into text using the voice converter 120. Here, the display apparatus 100 may sequentially change a plurality of different determination criteria until a control operation corresponding to the converted text is determined and then determine the control operation corresponding to the converted text.

The display apparatus 100 may be a display apparatus such as a smart TV, but this is only an . Alternatively, the display apparatus 100 may be realized as, for example, a desktop personal computer (PC), a tablet PC, a smartphone, or the like or may be realized as another type of input device such as a voice input device.

The voice input circuit 110 is an element that receives the voice of the user. In detail, the voice input circuit 110 may include a microphone and associated circuitry to directly receive the user's voice as sound and convert the sounds to an electric signal, or may include circuitry to receive an electric signal corresponding to the user's voice input to the display apparatus 100 through a microphone that is connected to the display apparatus 100 by wire or wireless. The voice input circuit 110 transmits the signal corresponding to the user's voice to the voice converter 120.

The voice converter 120 parses a waveform of a characteristic of the user's voice signal (i.e., a characteristic vector of the user's voice signal) to recognize words or a word string corresponding to the voice uttered by a user and outputs the recognized words as text information.

In detail, the voice converter 120 may recognize the words or the word string uttered by the user from the user voice signal by using at least one of various recognition algorithms such as a dynamic time warping method, a Hidden Markov model, a neural network, etc. and convert the recognized voice into text. For example, if the Hidden Markov model is used, the voice converter 120 respectively models a time change and a spectrum change of the user voice signal to detect a similar word from a stored language database (DB). Therefore, the voice converter 120 may output the detected word or words as text.

The voice input circuit 110 and the voice converter 120 have been described as elements that are installed in the display apparatus 100 in the present exemplary embodiment, but this is only an example. Alternatively, the voice input circuit 110 and the voice converter 120 may be realized as external devices.

The controller 140 performs a control operation corresponding to the user voice input through the voice input circuit 110. The controller 140 may start a voice input mode according to a selection of the user. If the voice input mode starts, the controller 140 may activate the voice input circuit 110 and the voice converter 120 to receive the user's voice. If the user voice is input when a voice input mode is active, the controller 140 analyzes an intention of the user by using a plurality of different determination criteria stored in the storage 130. The controller 140 determines a control operation according to the analysis result to perform an operation of the display apparatus 100

In detail, the controller 140 determines whether the converted text corresponds to a title of an object in a displayed screen. If the converted text corresponds to the title of the object, the controller 140 performs an operation corresponding to the object. For example, the controller 140 may perform an operation matching the object. In detail, the object may include at least one of a content title, an image title, a text icon, a menu name, and a number displayed on the screen.

According to an exemplary embodiment, if only a part of the title of the object is displayed, and only a part of the converted text matches at least a part of the title of the displayed object, the controller 140 determines that the converted text corresponds to the title of the object. For example, if only "Stairway" is displayed of a content title "Stairway to Heaven," and the converted text "stair" is input, the controller 140 may determine that the text corresponds to the title.

According to another exemplary embodiment, if only a part of one word included in the title of the object is displayed, and the converted text matches the whole one word, the controller 140 determines that the converted text corresponds to the title of the object. For example, if only "Stair" is displayed of the content title "Stairway to Heaven," and the converted text "stairway" is input, the controller 140 may determine the converted text corresponds to the title.

If the controller 140 determines the converted text does not correspond to the title of the object, the controller 140 determines whether the converted text corresponds to a command stored in the storage 130. If the controller 140 determines the converted text corresponds to the command stored in the storage 130, the controller 140 performs an operation corresponding to the command. Alternatively, the controller 140 may perform an operation that matches the command.

Also, if the controller 140 determines that the converted text does not correspond to the command stored in the storage 130, the controller 140 determines whether a meaning of the converted text is analyzable. If the controller 140 determines that the meaning of the converted text is analyzable, the controller 140 may analyze the meaning of the converted text and display a response message corresponding to the analysis result.

If the controller 140 determines the meaning of the converted text is not analyzable, the controller 140 may perform a search by using the converted text as a keyword.

As described above, the controller 140 may directly perform the work of analyzing the user voice signal and converting the user voice signal into converted text. However, according to other exemplary embodiments, the controller 140 may transmit the user voice signal to an external server apparatus, and the external server apparatus may convert the user voice signal into text. Also, the controller 140 may be provided with the converted text. The external server apparatus that converts a user voice signal into text may be referred to as a voice recognition apparatus for convenience of description. An operation of the display apparatus 100 that operates along with a voice recognition apparatus to convert a voice into a text will be described in detail in a subsequent exemplary embodiment.

The storage 130 is an element that stores various types of modules for driving the display apparatus 100. The storage 130 may store a plurality of determination criteria and a plurality of commands for providing a voice recognition effect. For example, the storage 130 may store software including a voice conversion module, a text analysis module, a plurality of determination criteria, a control analysis criteria, a base module, a sensing module, a communication module, a presentation module, a web browser module, and a service module. The plurality of determination criteria may include whether converted text corresponds to a title of an object displayed on the screen, whether the converted text corresponds to a stored command, whether the converted text is grammatically analyzable, and whether the converted corresponds to a search keyword. The controller 140 may sequentially move through the plurality of determination criteria and apply the plurality of determination criteria sequentially in order to the converted text until a control operation is determined. In other words, the determination criteria represent a hierarchy of different tiers. That is, first it is determined whether the converted text corresponds to a displayed object in a first tier, and then if not, it is determined whether the converted text corresponds to a stored command in a second tier, and so on. After the control operation is determined, the control operation is performed.

According to an exemplary embodiment, the storage 130 may store at least one of a command for controlling power of the display apparatus 100, a command for controlling a channel of the display apparatus 100, and a command for controlling a volume of the display apparatus 100. A command may be stored in the storage 130 through an input of the user. The command of the display apparatus 100 is not limited thereto and may be various types of command.

The display apparatus 100 independently performs voice control in FIG. 1 but may operate along with the external server apparatus to perform the voice control.

Figure 2:
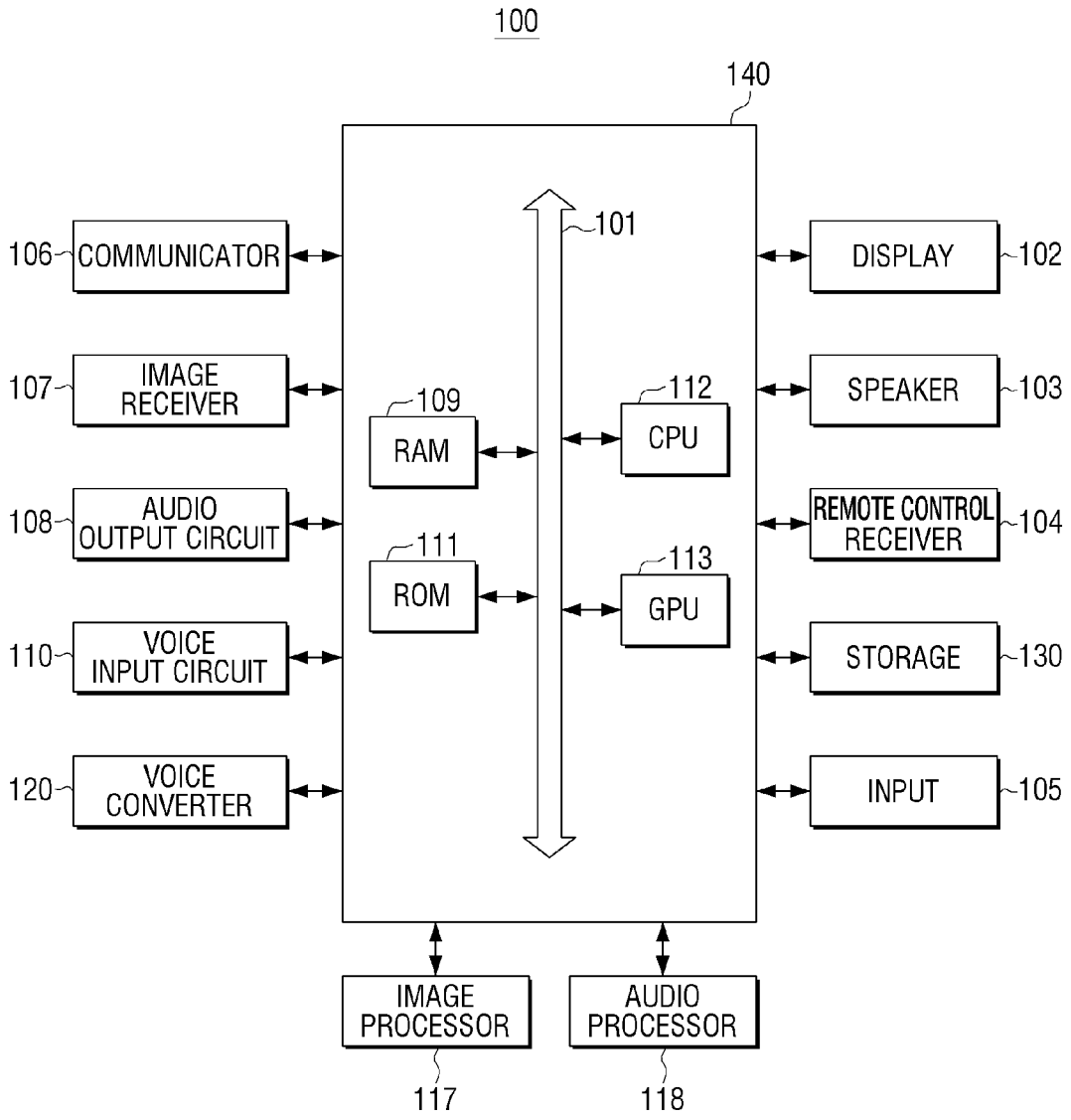
FIG. 2 is a block diagram illustrating a detailed structure of a display apparatus according to an exemplary embodiment.

FIG. 2 is a block diagram illustrating a detailed structure of the display apparatus of FIG. 1 according to an exemplary embodiment.

Figure 3:
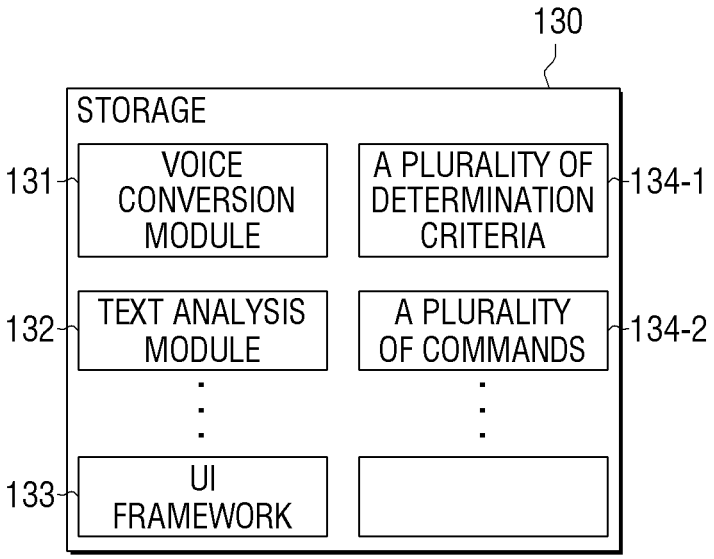
FIG. 3 is a block diagram illustrating a software structure of a storage, according to an exemplary embodiment.

FIG. 3 is a block diagram illustrating a software structure of a storage according to an exemplary embodiment.

Referring to FIG. 2, the display apparatus 100 includes a display 102, the voice circuit 110, the voice converter 120, a communicator 106, an image receiver 107, an audio output circuit 108, the storage 130, an image processor 117, an audio processor 118, an input circuit 105, the controller 140, a speaker 103, and a remote control receiver 104.

In FIG. 2, the display apparatus 100 is described as an apparatus having various functions such as a communication function, a broadcast receiving function, a video playback function, a display function, etc. to synthetically illustrate various types of elements. Therefore, according to exemplary embodiments, some of the elements of FIG. 2 may be omitted or changed or other types of elements may be added.

The display 102 displays at least one of a video frame and various types of screens generated by a graphic processor (not shown). The video frame is formed by receiving image data from the image receiver 107 and then processing the image data by the image processor 117.

The communicator 106 is an element that communicates with various types of external apparatuses or an external server. The communicator 106 may include various types of communication chips such as a WiFi chip, a Bluetooth chip, a near field communication (NFC) chip, a wireless communication chip, etc. Here, the WiFi chip, the Bluetooth chip, and the NFC chip respectively perform communications according to a WiFi method, a Bluetooth method, and an NFC method. The NFC chip refers to a chip that operates according to an NFC method using a band of 13.56 MHz among various radio frequency identification (RFID) frequency bands such as 135 kHz, 13.56 MHz, 433 MHz, 860~960 MHz, 2.45 GHz, etc. If the WiFi chip or the Bluetooth chip is used, various types of connection information, such as a subsystem identification (SSID), a session key, etc., may be first transmitted and received to perform communication connections by using the various types of connection information and then transmit and receive various types of information. The wireless communication chip refers to a chip that perform communications according to various communication standards such as IEEE, Zigbee, 3rd Generation (3G), 3rd Generation Partnership Project (3GPP), Long Term Evolution (LTE), etc.

According to an exemplary embodiment, the communicator 106 may transmit a user voice signal to a voice recognition apparatus and receive text, into which the user voice is converted, from the voice recognition apparatus. The communicator 106 may also store text information and search information desired by a user in an external server apparatus.

The image receiver 107 receives the image data through various sources. For example, the image receiver 107 may receive broadcast data from an external broadcasting station or may receive image data from an external apparatus (for example, a digital versatile disc (DVD) apparatus).

The audio output circuit 108 is an element that outputs various types of audio data processed by the audio processor 118, various types of notification sounds or voice messages. In particular, the audio output circuit 108 may output the user voice signal received from an external source.

The storage 130 stores various types of modules for driving the display apparatus 100. The modules stored in the storage 130 will now be described with reference to FIG. 3. As shown in FIG. 3, the storage 130 may store software including a voice conversion module 131, a text analysis module 132, a user interface (UI) framework 133, a plurality of determination criteria 134-1, a plurality of commands 134-2, a base module, a sensing module, a communication module, a presentation module, a web browser module, and a service module. The software modules stored in the storage 130, when executed by a microprocessor, cause the display apparatus 100 to perform various actions.

According to an exemplary embodiment, the storage 130 may store at least one of a command for controlling power of the display apparatus 100, a command for controlling a channel of the display apparatus 100, and a command for controlling a volume of the display apparatus 100. The plurality of commands 134-2 may be stored in the storage 130 through an input of the user. A command of the display apparatus 100 is not limited to the above-described exemplary embodiment but may be various types of commands.

The voice conversion module 131, when executed by a processor, such as a microprocessor or microcontroller, converts a voice input by the user into text to output text information.

The text analysis module 132, when executed by a processor, such as a microprocessor or microcontroller, analyzes the converted text to perform an accurate function of the display apparatus 100.

Here, the base module, when executed by a processor, such as a microprocessor or microcontroller, processes signals transmitted from respective pieces of hardware included in the display apparatus 100 and transmits the processed signals to an upper layer module. The sensing module, when executed by a processor, such as a microprocessor or microcontroller, collects information from various types of sensors, and analyzes and manages the collected information and may include a face recognition module, a voice recognition module, a motion recognition module, an NFC recognition module, etc. The presentation module, when executed by a processor, such as a microprocessor or microcontroller, configures a display screen and may include a multimedia module for playing back and outputting a multimedia content and a UI rendering module for processing a UI and a graphic. The communication module, when executed by a processor, such as a microprocessor or microcontroller, communicates with an external apparatus. The web browser module, when executed by a processor, such as a microprocessor or microcontroller, performs web browsing to access a web server. The service module includes various types of applications, which when executed by a processor, such as a microprocessor or microcontroller, provide various types of services.

Returning to FIG. 2, the voice input circuit 110 is an element that receives the voice of the user. In detail, the voice input circuit 110 may include a microphone and associated circuitry to directly receive the user's voice as sound and convert the sounds to an electric signal, or may include circuitry to receive an electric signal corresponding to the user's voice input to the display apparatus 100 through a microphone that is connected to the display apparatus 100 by wire or wireless. The voice input circuit 110 transmits the signal corresponding to the user's voice to the voice converter 120.

The voice converter 120 parses a waveform of a characteristic of the user's voice signal (i.e., a characteristic vector of the user's voice signal) to recognize words or a word string corresponding to the voice uttered by a user and outputs the recognized words as text information.

In detail, the voice converter 120 may recognize the words or the word string uttered by the user from the user voice signal by using at least one of various recognition algorithms such as a dynamic time warping method, a Hidden Markov model, a neural network, etc. and convert the recognized voice into text. For example, if the Hidden Markov model is used, the voice converter 120 respectively models a time change and a spectrum change of the user voice signal to detect a similar word from a stored language database (DB). Therefore, the voice converter 120 may output the detected word or words as text. The audio processor 118 is an element that processes audio data. The audio processor 118 may perform various types of processing, such as decoding, amplifying, noise filtering, etc., with respect to the audio data. The audio data processed by the audio processor 180 may be output to the audio output circuit 108.

The input circuit 105 receives a user command for controlling an overall operation of the display apparatus 100. In particular, the input circuit 105 may receive a user command for executing a voice input mode, a user command for selecting a service that is to be performed, or the like.

The input circuit 105 may be realized as a touch panel, but this is only an example. Alternatively, for example, the input circuit 105 may be realized as another type of input device that may control the display apparatus 100, such as a remote controller, a pointing device, or the like.

The controller 140 controls an overall operation of the display apparatus 100 by using various types of programs and modules stored in the storage 130. The controller 140 may be one or more microprocessors.

The controller 140 performs a control operation corresponding to the user voice input through the voice input circuit 110. The controller 140 may start a voice input mode according to a selection of the user. If the voice input mode starts, the controller 140 may activate the voice input circuit 110 and the voice converter 120 to receive the user's voice. If the user voice is input when a voice input mode is active, the controller 140 analyzes an intention of the user by using a plurality of different determination criteria stored in the storage 130. The controller 140 determines a control operation according to the analysis result to perform an operation of the display apparatus 100.

In detail, the controller 140 determines whether the converted text corresponds to a title of an object in a displayed screen. If the converted text corresponds to the title of the object, the controller 140 performs an operation corresponding to the object. For example, the controller 140 may perform an operation matching the object. In detail, the object may include at least one of a content title, an image title, a text icon, a menu name, and a number displayed on the screen. An operation of determining whether the text corresponds to the displayed object will now be described with reference to FIGS. 4 through 6.

Figure 4:
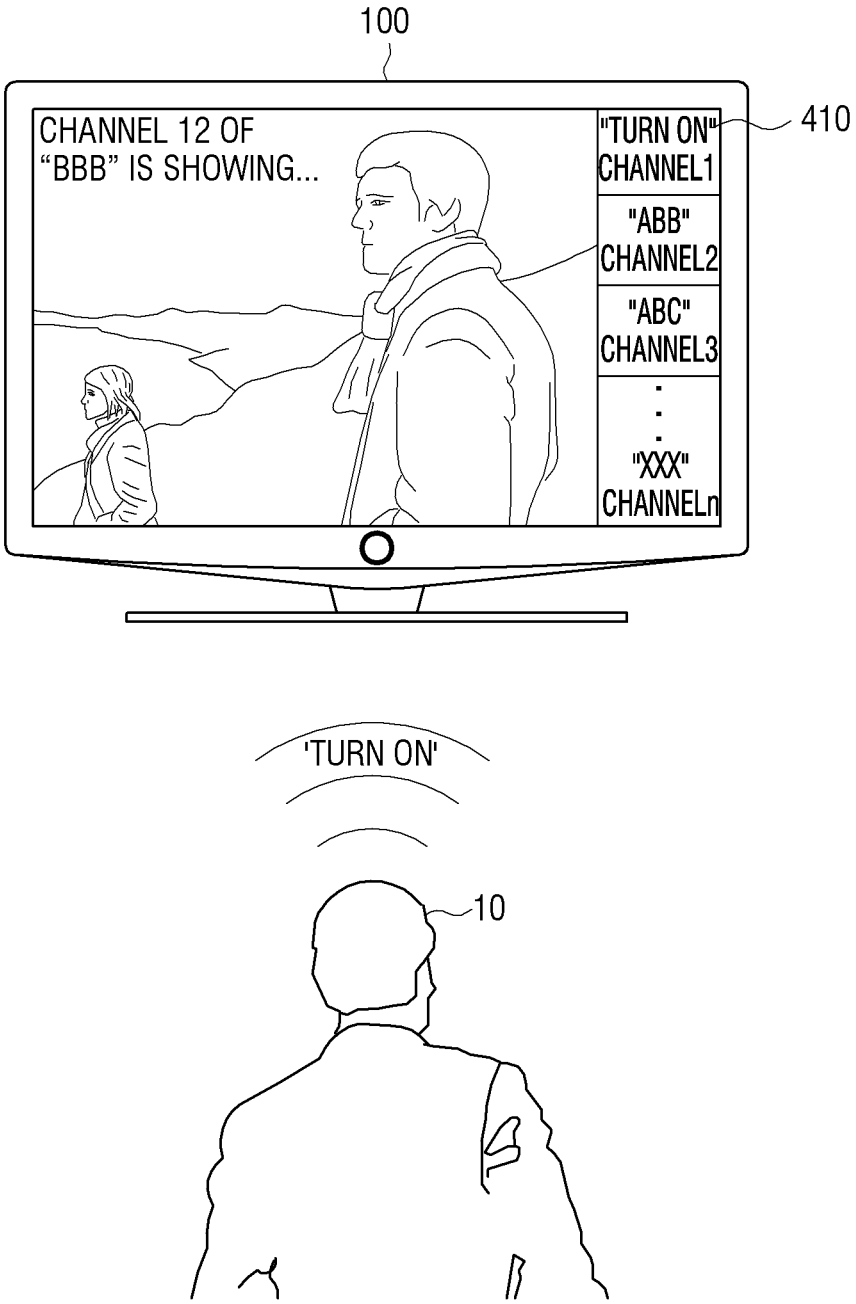
FIGS. 4, 5 and 6 are views illustrating a voice control operation according to an exemplary embodiment.

FIG. 4 is a view illustrating text that corresponds to a title displayed in a screen displayed on the display apparatus 100, or to a number displayed on a side of the display apparatus 100. The text may match or be equal to the title displayed or the number displayed. If the text into which the user voice signal is converted corresponds to the title displayed in a display screen, the controller 140 performs a corresponding function. For example, if a user 10 utters a voice "turn on", the display apparatus 100 converts the input voice into text through the voice converter 120. The controller 140 determines that channel 1 410 of "turn on" of a plurality of titles displayed on a screen of a TV corresponds to the text "turn on" into which the input voice is converted, to change channel 12 of "BBB", which is currently shown, to channel 1 410 of "turn on".

Figure 5:
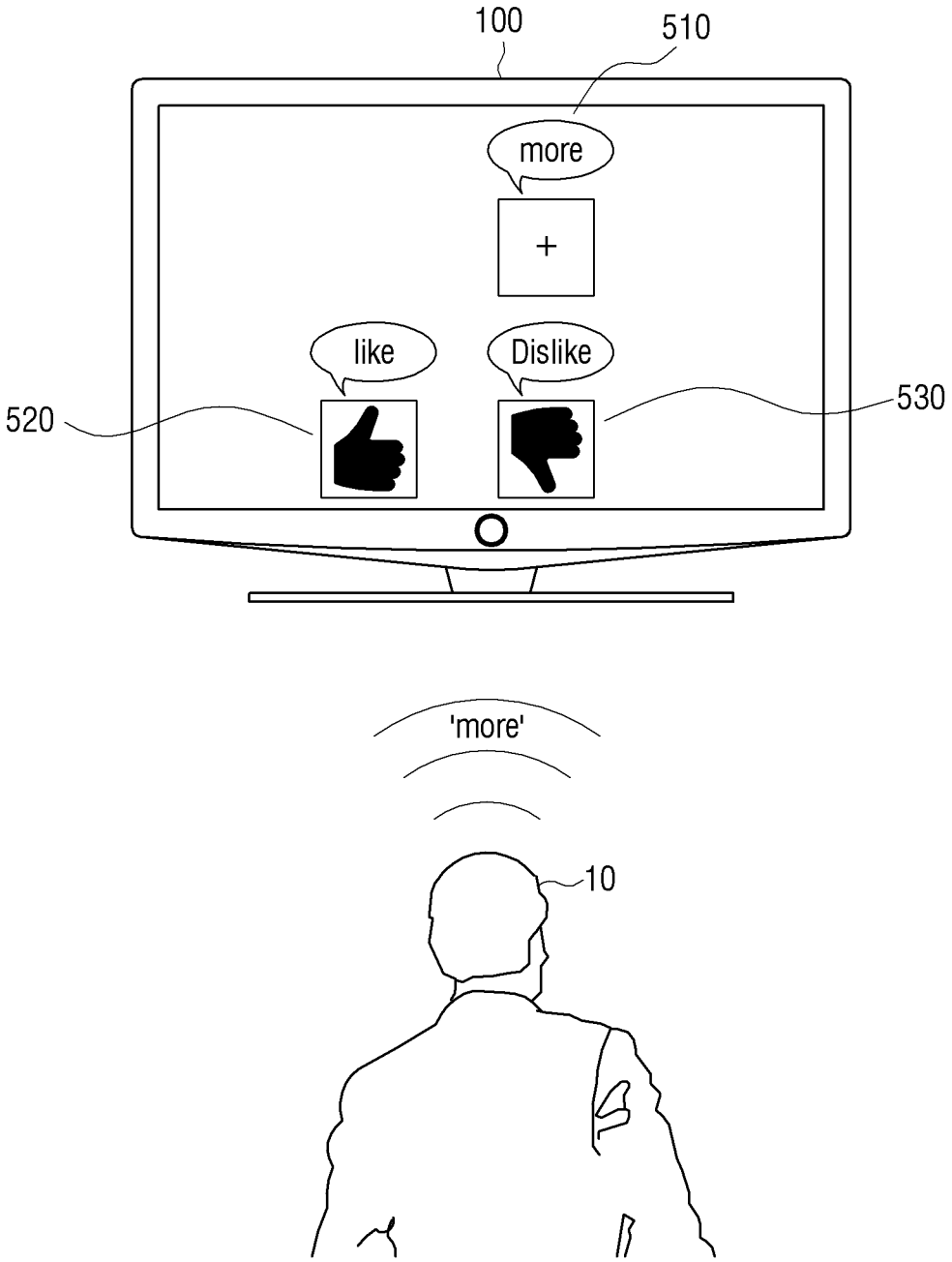

According to another exemplary embodiment, FIG. 5 illustrates text that corresponds to a plurality of icons displayed on a screen of the display apparatus 100 and/or titles of the icons. The text may match or be equal to the plurality of icons displayed and/or the titles of the icons. If the text into which the user voice is converted corresponds to the plurality of icons displayed on the screen and the titles of the icons, the controller 140 performs a corresponding function. For example, if the user 10 utters a voice "more", the display apparatus 100 converts the voice into text through the voice converter 120. Since a plurality of objects 510 through 530 include an icon 510 "more" corresponding to the text "more" into which the voice is converted, the controller 140 performs a function of the icon 510 "more".

Figure 6:
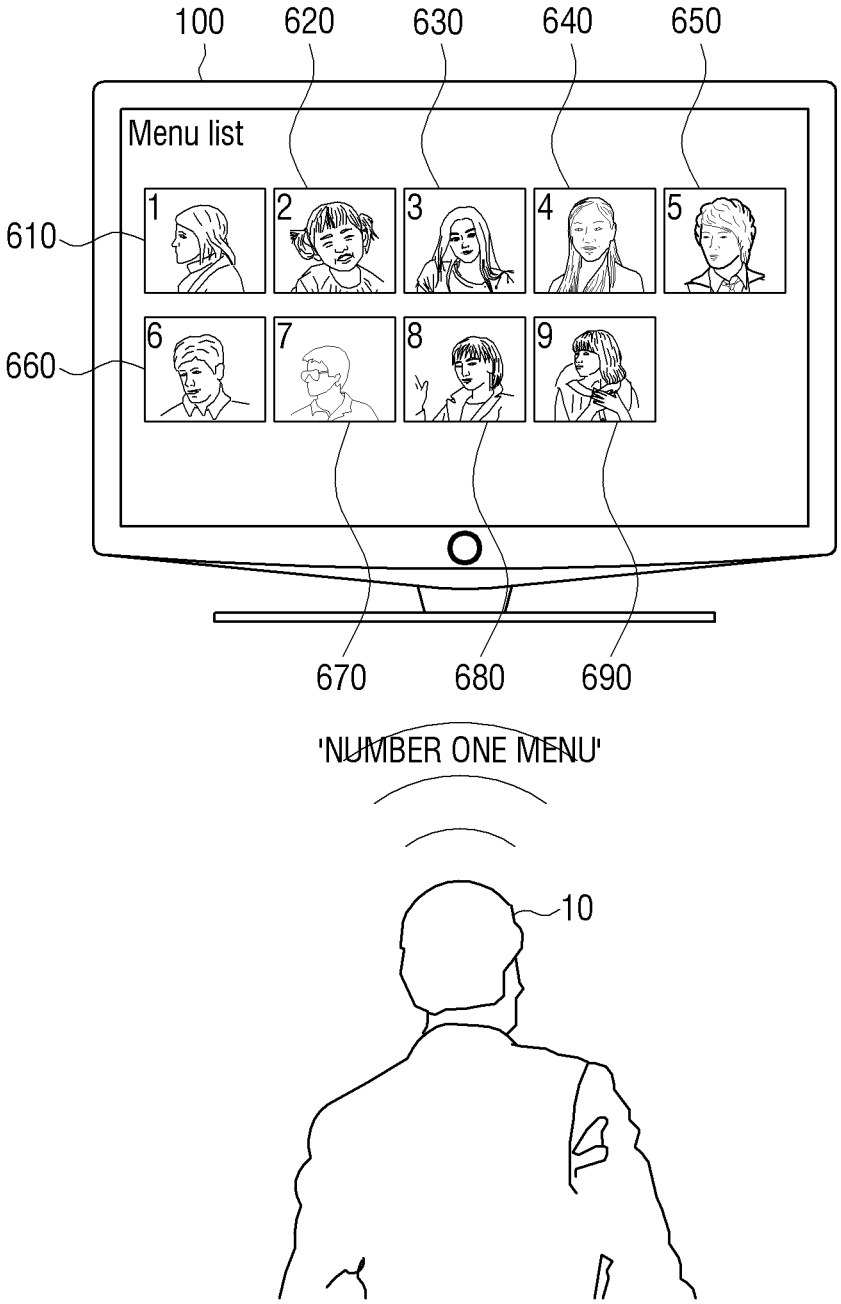

According to another exemplary embodiment, FIG. 6 illustrates text that corresponds to a plurality of menus displayed on a screen of the display apparatus 100 and/or numbers displayed on upper sides of the menus. The text may match or be equal to the plurality of menus displayed and/or the numbers displayed. If the text into which the voice is converted corresponds to the plurality of menus displayed on the screen and/or the numbers displayed on the upper sides of the menus, the controller 140 performs a corresponding function. For example, if the user 10 utters a voice "number 1 menu" 3 when a list of a plurality menus is displayed on the display apparatus 100, and/or numbers are respectively displayed on upper sides of the menus, the display apparatus 100 converts the input voice into text through the voice converter 120. The controller 140 executes "number 1 menu" 610 corresponding to the converted text from a list of a plurality of menus 610 through 690 in which numbers are displayed.

Figure 7:
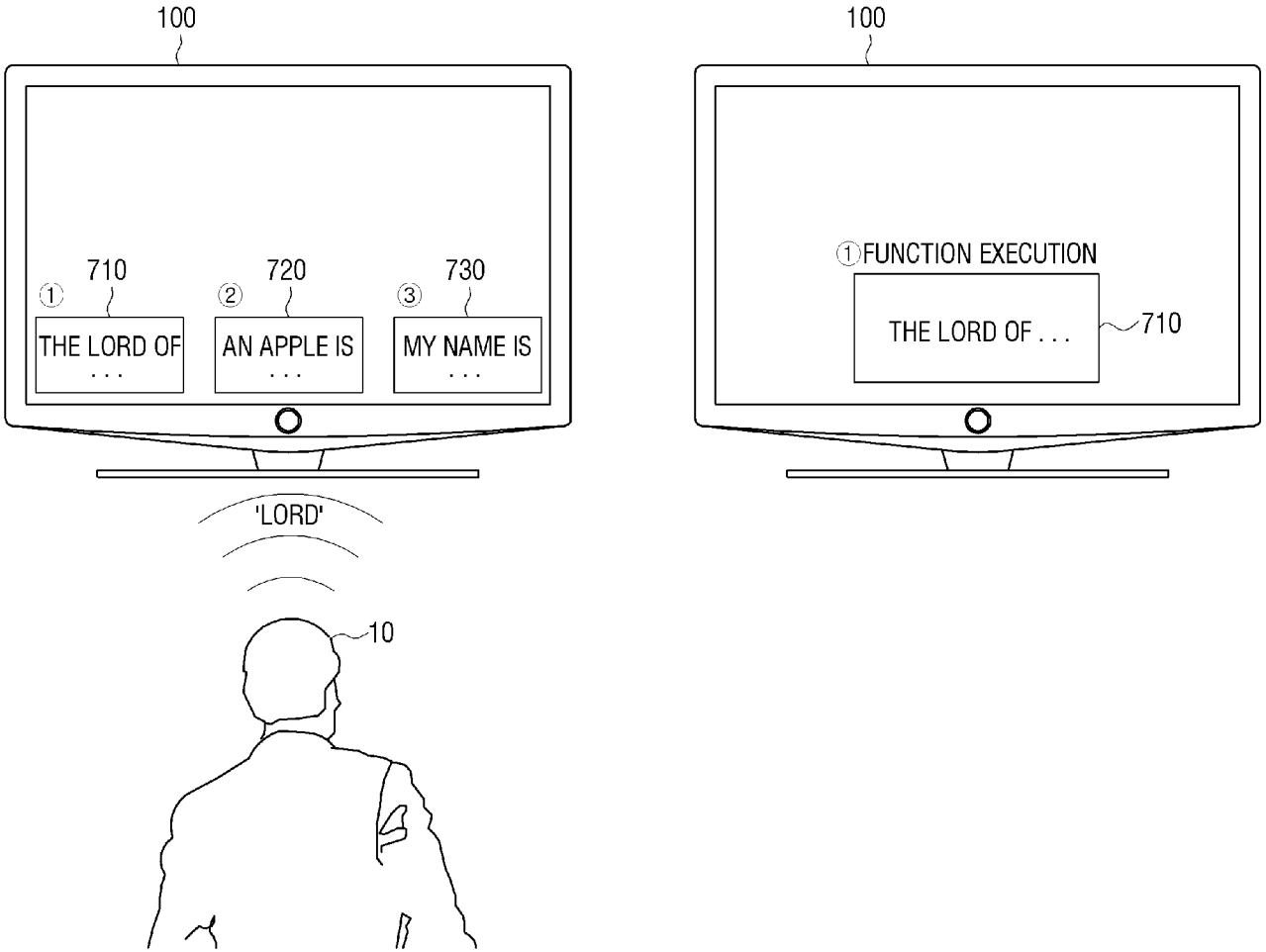
FIGS. 7 and 8 are views illustrating a voice control operation according to another exemplary embodiment.

According to another exemplary embodiment, as shown in FIG. 7, if only a part of an object is displayed, and the text into which a voice is converted corresponds to at least a part of a title of the displayed object, a determination is made that the converted text corresponds to the title of the object. For example, if function execution objects 1 710, 2 720, and 3 730 are displayed on the display apparatus 100 as "THE LORD OF . . . ", "AN APPLE IS . . . ", and "MY NAME IS . . . ", respectively, and the user 10 utters a voice "Lord", the display apparatus 100 converts the input voice into text through the voice converter 120. The controller 140 determines that the converted text "Lord" uttered by the user 10 corresponds to at least a part of functional execution object 1 710 that is displayed, and performs a function of the function execution object 1 710.

Figure 8:
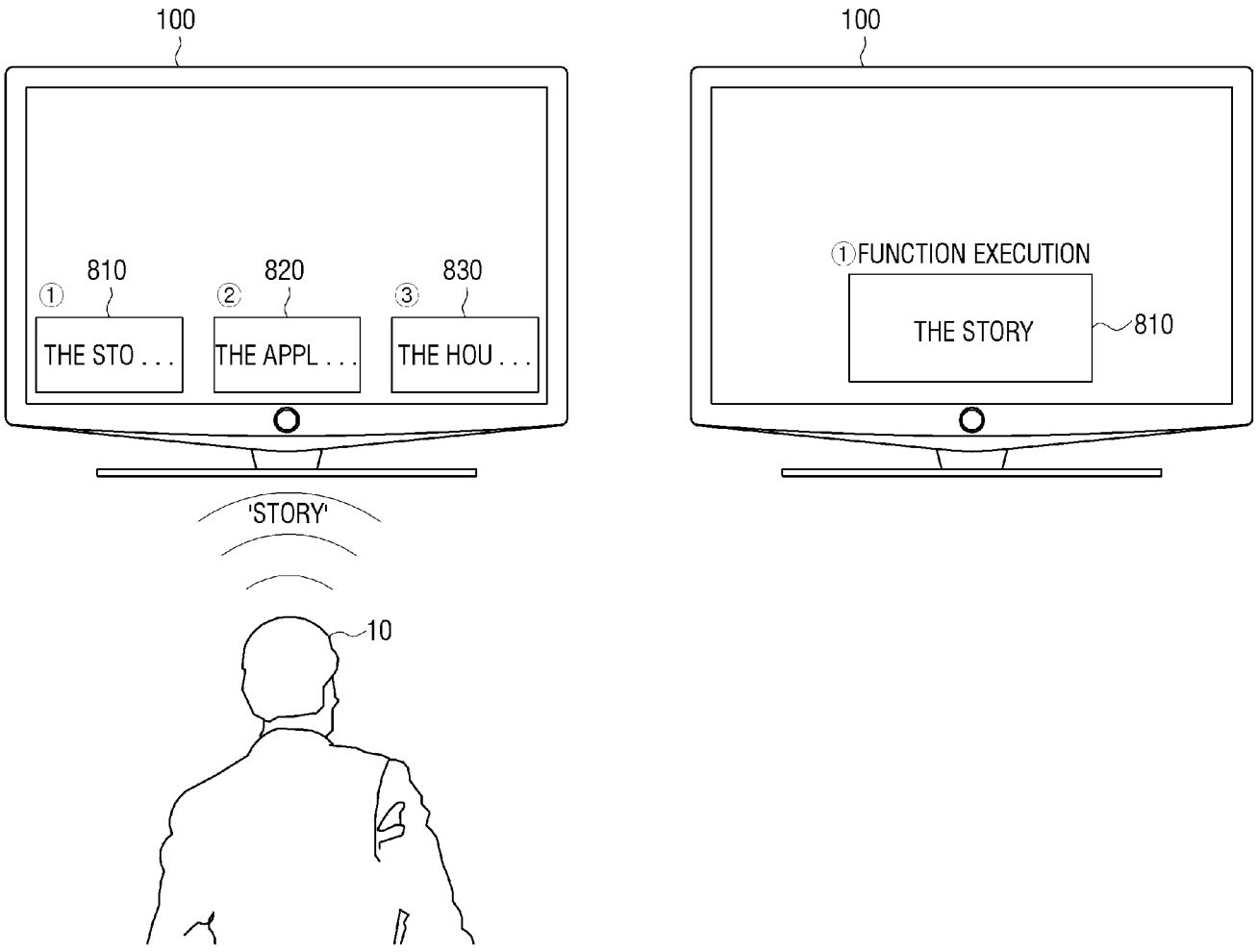

According to another exemplary embodiment, as shown in FIG. 8, if only a part of one of words of an object is displayed, and the converted text corresponds to the whole one word, a determination is made that the converted text corresponds to a title of the object. For example, if function execution objects of 1 810, 2 820, and 3 830 are displayed on the display apparatus 100 as "THE STO . . . ", "THE APPL . . . " and "THE HOU . . . ", respectively, and the user 10 utters a whole word "story", the display apparatus 100 converts the input voice "story" into text through the voice converter 120. The controller 140 determines that the converted text "story" uttered by the user 10 corresponds to the title of the function execution object 1 810, and performs a function of the function execution object 1 810.

Figure 9:
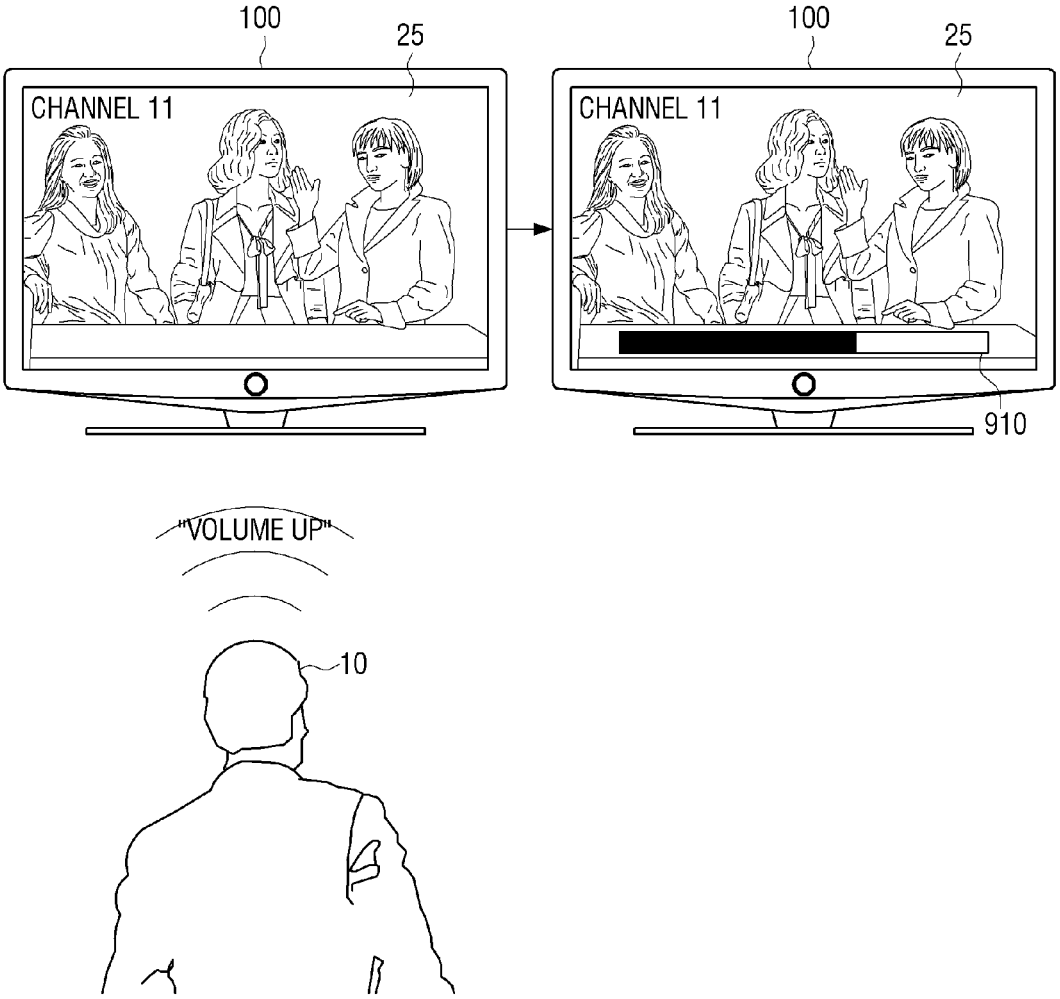
FIG. 9 is a view illustrating a voice control operation according to a stored command according to an exemplary embodiment.

According to an exemplary embodiment, if the text into which the user voice is converted does not correspond to the title of the object, the controller 140 determines whether the converted text corresponds to a command stored in the storage 130. If the controller 140 determines that the converted text corresponds to the command stored in the storage 130, the controller 140 performs an operation corresponding to the command. Alternatively, the controller 140 may perform an operation matching the command. For example, referring to FIG. 9, if channel 11 of a TV is shown as denoted by 25, and a voice "volume up" is input, the controller 140 converts the input voice "volume up" into text through the voice converter 120. The controller 140 determines whether the converted text "volume up" corresponds to an object displayed on a screen of the TV. As shown in FIG. 9, since an object corresponding to the text "volume up" does not exist on the screen of the TV, the controller 140 determines that the converted text "volume up" corresponds to a command stored in the storage 130, and the controller 140 turns up a volume of the displayed channel 11.

Figure 10:
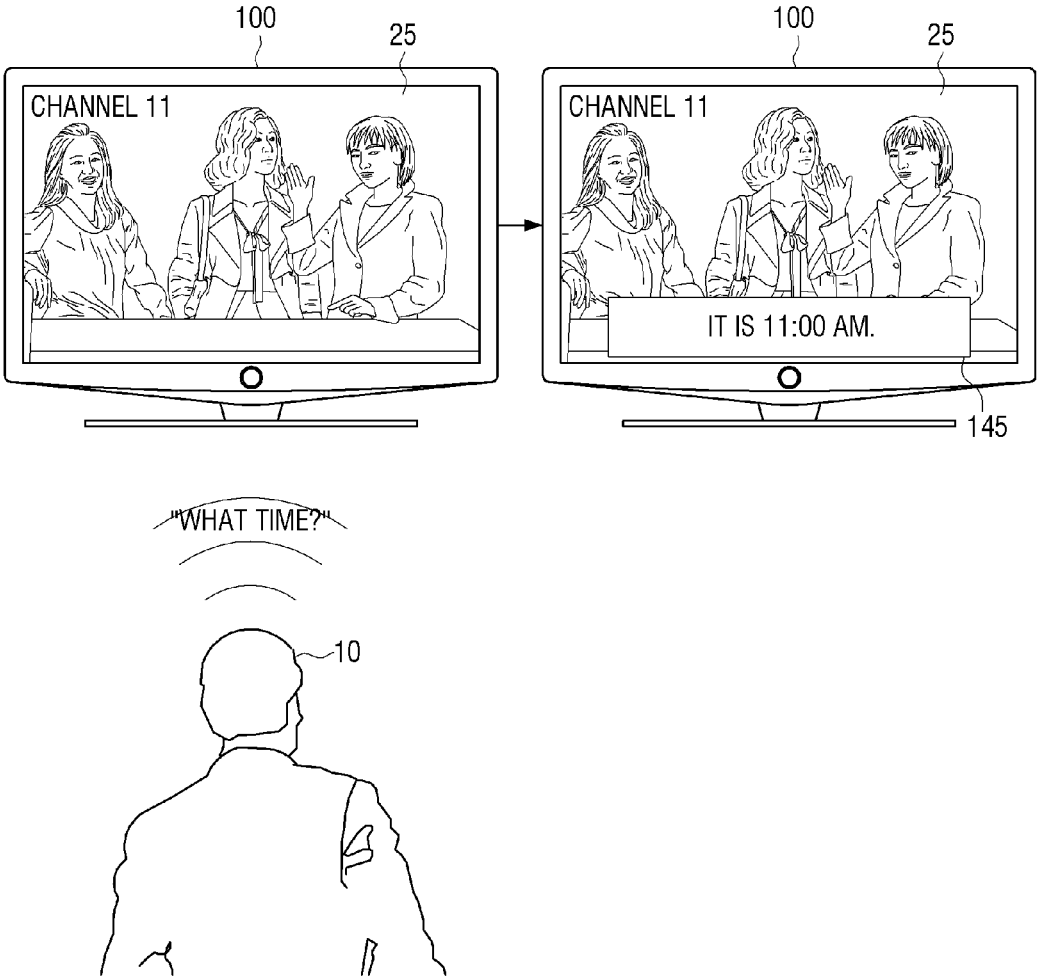
FIG. 10 is a view illustrating a voice control operation when grammar analysis is possible according to an exemplary embodiment.

Also, as described above, if an input voice does not correspond to a command stored in the storage 130, the controller 140 determines whether a meaning of the input voice is grammatically analyzable. If the controller 140 determines that the meaning of the input voice is grammatically analyzable, the controller 140 analyzes the meaning of the input voice and displays a response message corresponding to the analysis result. For example, referring to FIG. 10, if the user 10 inputs a voice "what time" when channel 11 of the TV is shown on a screen 25, the controller 140 converts the input voice "what time" into text through the voice converter 120. Here, the controller 140 determines whether the converted text corresponds to a title of an object displayed on the screen 25 of the display apparatus 100. Since an object corresponding to the converted text "what time" is not displayed, the controller 140 determines whether a function corresponding to the converted text "what time" is stored in the storage 130. Assuming here that the converted text "what time" does not correspond to a function stored in the storage 130, the controller 140 determines whether the converted text "what time" is grammatically uttered, according to a criterion stored in the storage 130. If the controller 140 determines that the converted text "what time" is grammatically uttered, the controller 140 may display time information 145 "It is 11:00 AM." on a side of the screen on which channel 11 is shown. In other words, the display apparatus 100 may display a response message corresponding to the analysis result on the screen.

Figure 11A:
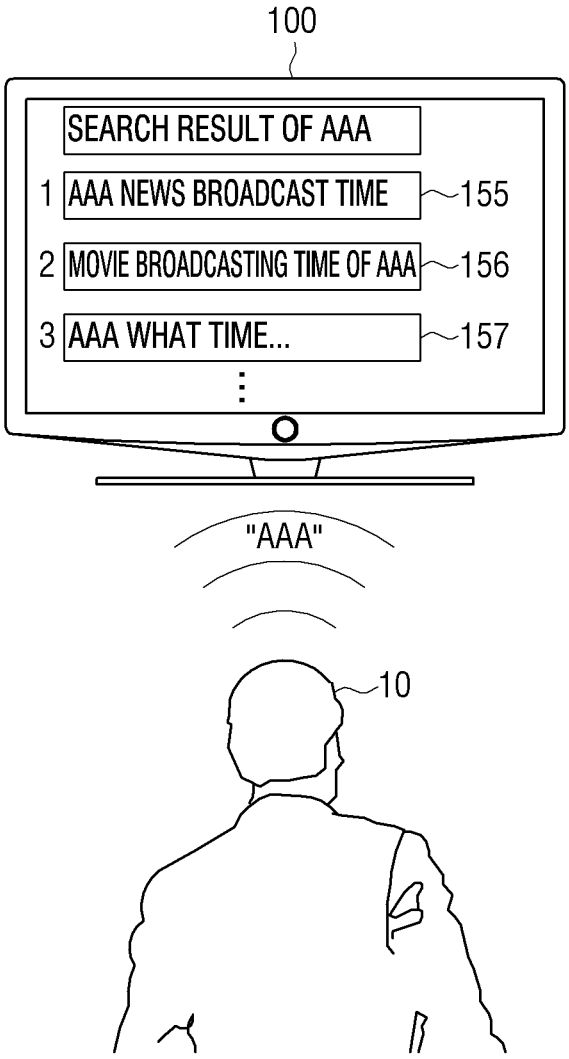
FIGS. 11A, 11B and 11C are views illustrating a voice control operation when grammar analysis is impossible according to an exemplary embodiment.
Figure 11B:
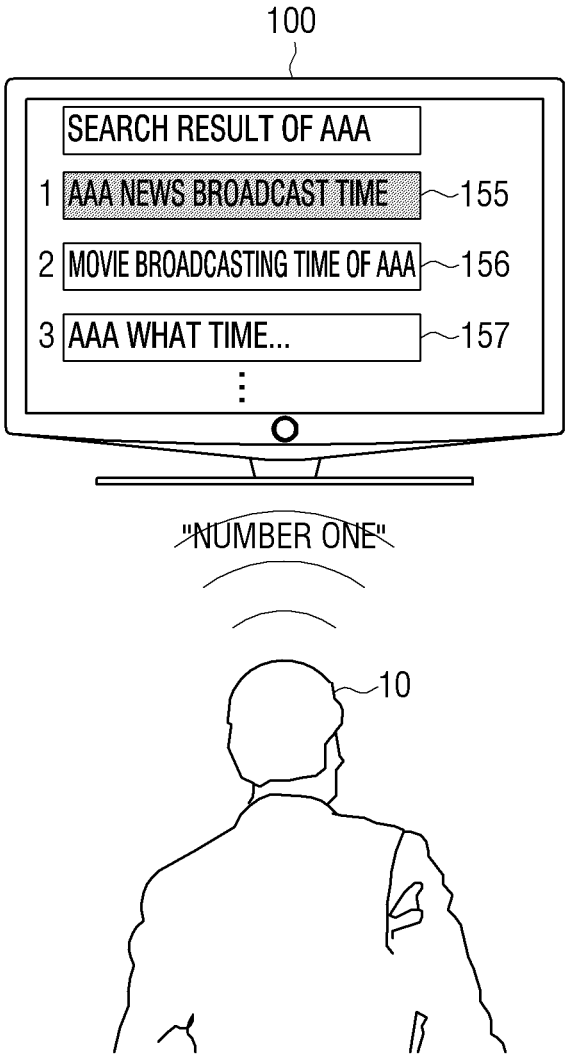
Figure 11C:
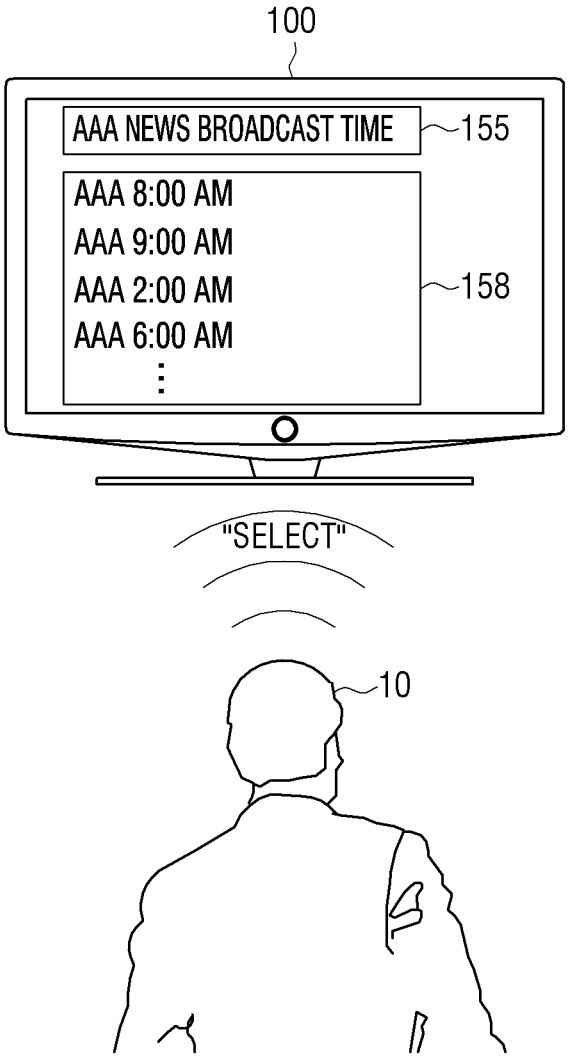

According to another exemplary embodiment, as described above, if the controller 140 determines that the meaning of the input voice is not grammatically analyzable, the controller 140 may perform a search by using the converted text as a keyword. For example, referring to FIG. 11, if the user 10 inputs a voice "AAA", the controller 140 determines whether the converted text "AAA" corresponds to a title of an object displayed on a screen of the display apparatus 100. Assuming that the converted text "AAA" does not correspond to an object displayed on the screen or a command stored in the storage 130, the controller 140 determines if the converted text "AAA" is grammatically analyzable. Here, the controller 140 determines that the converted text "AAA" is not grammatically analyzable, and the controller 140 may perform a search by using the converted text "AAA" as a keyword. The controller 140 may perform a search in relation to the converted text "AAA" and display the search result on a screen, as shown in FIG. 11A. According to an exemplary embodiment, if a plurality of search results 155, 156, 157, . . . are searched, the controller 140 may display the plurality of search results 155, 156, 157, . . . along with corresponding numbers. If the user 10 inputs one of a plurality of lists through the voice circuit 110, i.e., inputs a voice "number one" 155, the controller 140 may display "AAA news broadcast time" along with a plurality of screen times 155 and 157. Here, an item selected by the user 10 may be displayed with a color, shape change, animation, etc. to be distinguished from other items. For example, in FIG. 11B, the controller 140 highlights "AAA news broadcast time". In FIG. 11C, if the user 10 then inputs a voice "select", the selected items is executed. In response to the user inputting a voice "select" after "AAA news broadcast time" is highlighted in FIG. 11B, the "AAA news broadcast time" of "8:00 AM", "9:00 AM", "2:00 AM", and "6:00 AM" is shown, as in FIG. 11C.

Returning to FIG. 2, the controller 140 includes a random access memory (RAM) 109, a read only memory (ROM) 111, a graphic processor 113, a main central processing unit (CPU) 112, first through nth interfaces (not shown), and a bus 101. Here, the RAM 109, the ROM 111, the graphic processor (GPU) 113, the main CPU 112, the first through nth interfaces, etc. may be connected to one another through the bus 101. The ROM 111 stores a command set for booting a system, etc. If power is supplied through an input of a turn-on command, the main CPU 112 copies an operating system (O/S) stored in the storage 130 into the RAM 109 and executes the O/S to boot the system according to the command stored in the ROM 111.

The GPU 113 generates a screen including various types of objects, such as an icon, an image, a text, etc., by using an operator (not shown) and a renderer (not shown). The operator calculates attribute values, such as coordinate values, shapes, sizes, colors, etc. in which objects will be respectively displayed according to a layout of a screen, by using a control command received from the input circuit 105. The renderer generates a screen having various types of layouts including objects based on the attribute values calculated by the operator. The screen generated by the renderer is displayed in a display area of the display 102.

The main CPU 112 accesses the storage 130 to perform booting by using the O/S stored in the storage 130. The main CPU 112 also performs various operations by using various types of programs, contents, data, etc. stored in the storage 130. The main CPU 112 may comprise at least one microprocessor and/or at least one microcontroller.

The first through nth interfaces are connected to various types of elements as described above. One of the first through nth interfaces may be a network interface that is connected to an external apparatus through a network.

In particular, the controller 140 may store text, into which a user voice signal is converted and which is received from a voice recognition apparatus through the communicator 106, in the storage 130.

If a voice recognition mode change command is input through the input circuit 105, the controller 140 executes a voice recognition mode. If the voice recognition mode is executed, the controller 140 converts a voice of a user into text using the voice input circuit 110 and the voice converter 120 as described above to control the display apparatus 100.

The speaker 103 outputs audio data generated by the audio processor 118.

Figure 12:
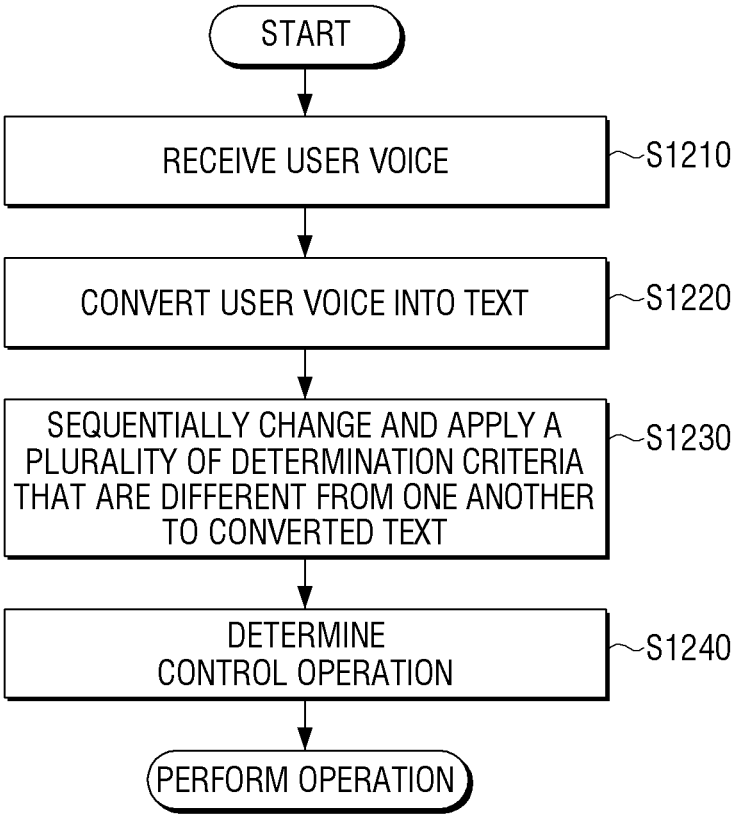
FIG. 12 is a flowchart of a method of controlling a voice, according to an exemplary embodiment.

FIG. 12 is a flowchart of a method of controlling a voice, according to an exemplary embodiment.

Referring to FIG. 12, if a voice input mode starts, the display apparatus 100 receives a user voice from a user in operation S1210. As described above, the user voice may be input through a microphone installed in a main body of the display apparatus 100, or through a remote controller or microphones installed in other external apparatus and then may be transmitted to the display apparatus 100.

The input user voice is converted into text in operation S1220. The conversion of the user voice into text may be performed by the voice converter 120 of the display apparatus 100, or by an external server apparatus separately installed outside the display apparatus 100.

In operation S1230, the controller 140 of the display apparatus 100 sequentially changes and applies the plurality of determination criteria 134-1 stored in the storage 130 to the converted text.

If the converted text corresponds to an object displayed on a screen of the display apparatus 100, the controller 140 determines a control operation corresponding to the object in operation S1240.

As described above, the object displayed on the screen may be at least one of a content title, an image title, a text icon, a menu name, and a number.

The operation is then performed, and the process ends.

Figure 13:
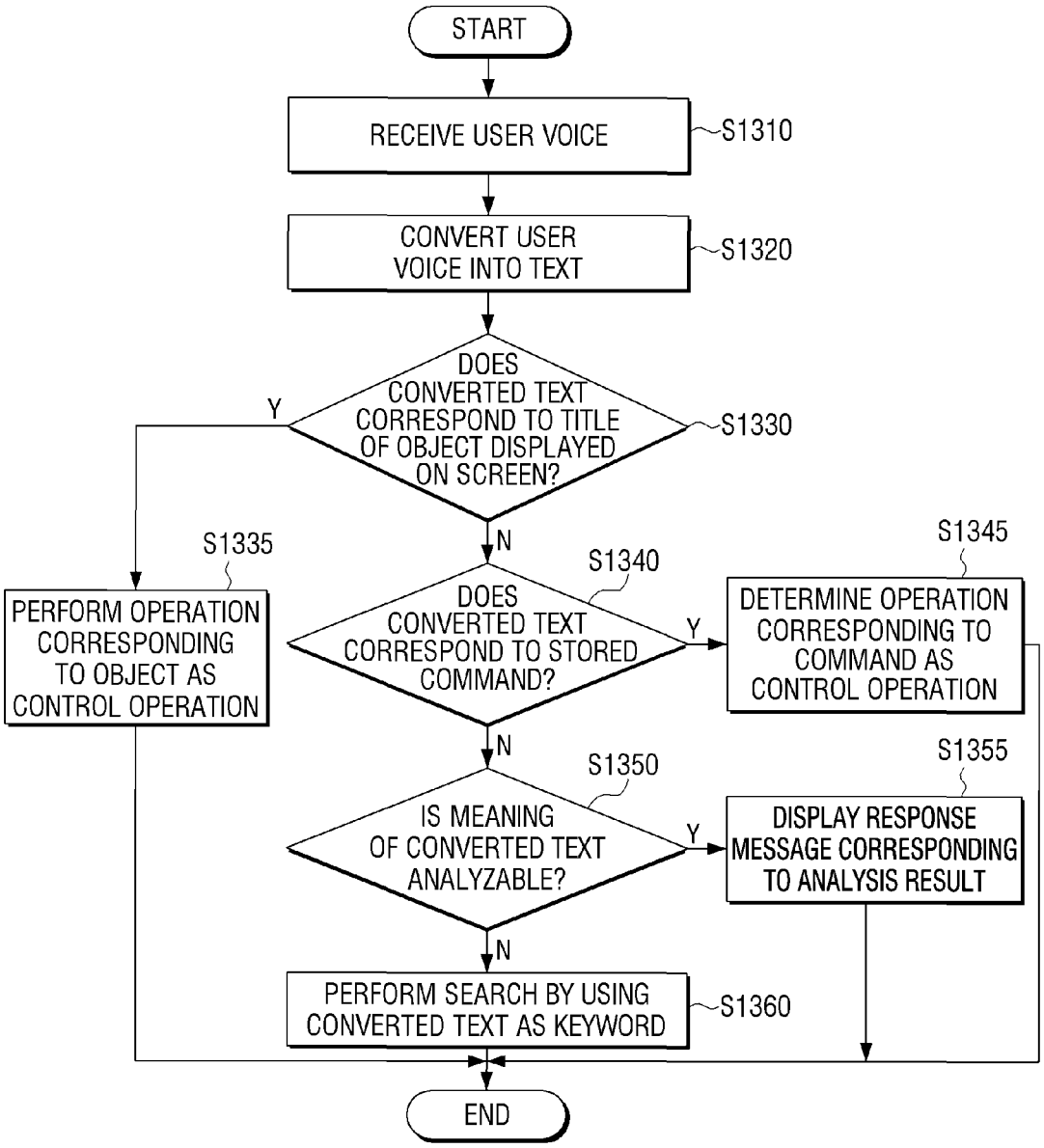
FIG. 13 is a flowchart of a method of controlling a voice, according to another exemplary embodiment.

FIG. 13 is a flowchart of a method of controlling a voice, according to another exemplary embodiment.

Referring to FIG. 13, if a voice input mode starts, the display apparatus 100 receives a voice of a user in operation S1310. As described above, the user voice may be input through a microphone installed in a main body of the display apparatus 100, or through a remote controller or microphones installed in other external apparatuses and then transmitted to the display apparatus 100.

The input user voice is converted into text in operation S1320. The conversion of the user voice into text may be performed by the voice converter 120 of the display apparatus 100. However, according to another exemplary embodiment, the display apparatus 100 may transmit the user voice to an external server apparatus, the external server apparatus may convert the user voice into text, and the display apparatus 100 may receive the converted text through the communicator 106.

In operation S1330, the display apparatus 100 determines whether the converted text corresponds to a title of an object displayed on a screen of the display apparatus 100. The object displayed on the screen may include at least one of a content title, an image title, a text icon, a menu name, and a number and may be variously realized according to types of the object.

If it is determined that the text corresponds to the title of the object displayed on the screen (operation S1330, Y), the display apparatus 100 performs an operation corresponding to the object as a control operation in operation S1335. For example, if the user inputs a voice "turn on", and the converted text "turn on" corresponds to "turn on channel 1" of a plurality of titles displayed on the screen of the display apparatus 100, the display apparatus 100 changes channel 12 of "BBB" that is currently shown into channel 1. (See FIG. 4).

If it is determined that the text does not correspond to the title of the object displayed on the screen (operation S1330, N), the display apparatus 100 determines whether the text corresponds to a command stored in the storage 130 in operation S1340.

Here, the storage 130 may designate and store voice commands respectively corresponding to various operations such as turn-on, turn-off, volume-up, volume-down, etc.

If it is determined that the text corresponds to the command stored in the storage 130 (operation S1340, Y), the display apparatus 100 determines an operation corresponding to the command as a control operation in operation S1345. For example, if the user utters a voice "volume up", and a command corresponding to the voice "volume up" is stored in the storage 130, the controller 140 turns up a volume of a corresponding channel. (See FIG. 9).

If it is determined that the text does not correspond to the command stored in the storage 130 (operation S1340, N), the display apparatus 100 determines whether a meaning of the text is analyzable in operation S1350.

If it is determined that the meaning of the text is analyzable (operation S1350, Y), the display apparatus 100 displays a response message corresponding to the analysis result in operation S1355. For example, if the user utters a voice "How's the weather today?", the display apparatus 100 may grammatically analyze the converted text "How's the weather today?" and display information about the weather on the screen of the display apparatus 100. (See also FIG. 10).

If it is determined that the meaning of the text is not analyzable (operation S1350, N), the display apparatus 100 performs a search by using the converted text as a keyword in operation S1360. For example, as in the above-described exemplary embodiment, if the user utters "AAA", the display apparatus 100 may perform a search using the converted text "AAA" as a keyword and display the search result in a result display area. Here, if a plurality of search results for the keyword "AAA" exist, one of the plurality of search results selected by the user may be realized and displayed according to various methods such as a color, a shape, an animation, etc. (See FIGS. 11A-11C).

Figure 14:
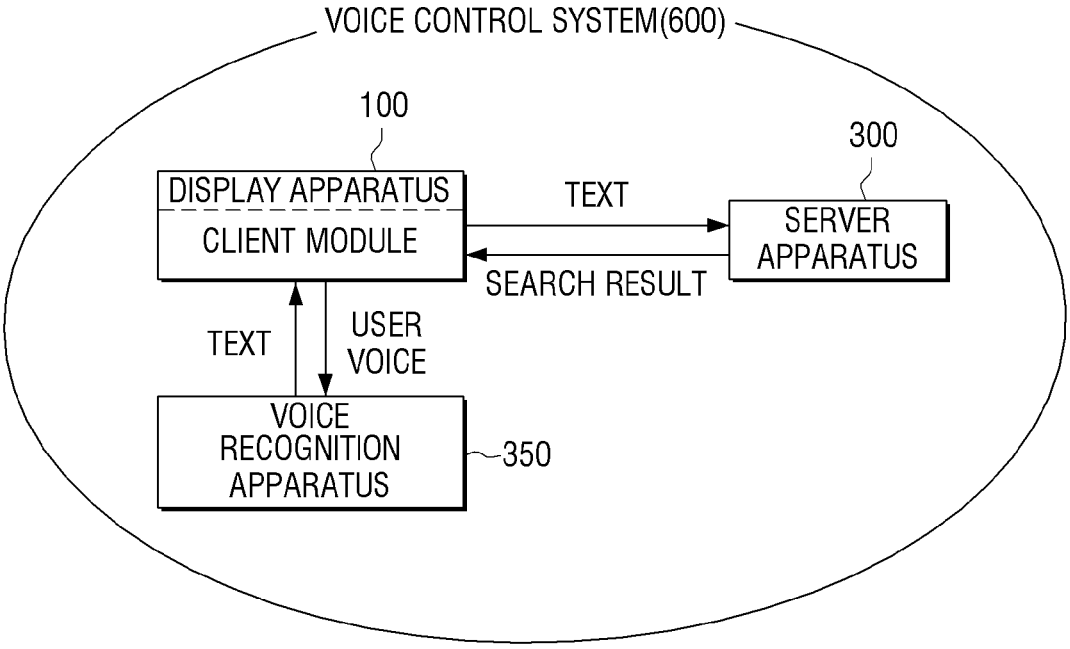
FIG. 14 is a view illustrating a structure of a voice control system according to an exemplary embodiment.

FIG. 14 is a view illustrating a structure of a voice control system according to an exemplary embodiment.

In detail, referring to FIG. 14, a voice control system 600 includes a voice recognition apparatus 350, a server apparatus 300, and the display apparatus 100.

The display apparatus 100 may include a client module that may operate along with the voice recognition apparatus 350 and the server apparatus 300. If a voice input mode starts, the controller 140 may execute the client module to perform a control operation corresponding to a voice input.

In detail, if a user voice is input, the controller 140 of the display apparatus 100 may transmit the user voice to the voice recognition apparatus 350 through the communicator 106. (See FIG. 2). The voice recognition apparatus 350 denotes a server apparatus that converts the user voice transmitted through the display apparatus 100 into text and returns the converted text to the display apparatus 100.

If the converted text is returned from the voice recognition apparatus 350 to the display apparatus 100, the display apparatus 100 sequentially applies the plurality of determination criteria 134-1 stored in the storage 130 to perform an operation corresponding to the converted text.

According to an exemplary embodiment, the display apparatus 100 may provide the server apparatus 300 with the converted text into which the user voice is converted. The server apparatus 300 may search a database DB thereof or other server apparatuses for information corresponding to the provided converted text. The server apparatus 300 may feed the search result back to the display apparatus 100.

According to various exemplary embodiments, even if a user inputs a simple keyword having no verb, an accurate operation corresponding to an intention of the user may be processed.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

[1. A voice controlling method of a display apparatus, the voice controlling method comprising:

receiving a voice of a user;

converting the voice into text;

determining a control operation corresponding to the text by sequentially applying a plurality of different determination criteria to the text; and performing the control operation to control the display apparatus, wherein the plurality of different determination criteria comprise criteria of whether the text corresponds to a title of an object displayed on a screen of the display apparatus, and whether the text corresponds to a stored command, a criterion of whether the text corresponds to a title of an object displayed on a screen of the display apparatus being applied before a criterion of whether the text corresponds to a stored command, and wherein the determining the control operation comprises:

determining whether the text corresponds to the title of the object;

in response to determining that the text corresponds to the title of the object, determining the control operation based on the object;

in response to determining that the text does not correspond to the title of the object, determining whether the text corresponds to the stored command; and in response to determining that the text corresponds to the stored command, determining an operation corresponding to the stored command as the control operation.]

[2. The voice controlling method of claim 1, wherein the determining the control operation based on the object comprises:

determining an operation corresponding to the object as the control operation.]

[3. The voice controlling method of claim 1, wherein the determining whether the text corresponds to the title of the object comprises, in response to a part of the title of the object being displayed and the text corresponding to at least a portion of the displayed part of the object, determining that the text corresponds to the title of the object.]

[4. The voice controlling method of claim 1, wherein the determining whether the text corresponds to the title of the object comprises, in response to only a part of one word included in the title of the object being displayed and the text corresponding to the whole one word, determining that the text corresponds to the title of the object.]

[5. The voice controlling method of claim 1, wherein the object comprises at least one of a content title, an image title, a text icon, a menu name, and a number that are displayed on the screen.]

[6. The voice controlling method of claim 1, wherein the stored command comprises at least one of a command for controlling power of the display apparatus, a command for controlling a channel of the display apparatus, and a command for controlling a volume of the display apparatus.]

[7. The voice controlling method of claim 1, further comprising:

in response to determining that the text does not correspond to the stored command, determining whether a meaning of the text is analyzable; and in response to determining that the meaning of the text is analyzable, analyzing the meaning of the text and determining an operation of displaying a response message corresponding to a result of the analyzing as the control command.]

[8. The voice controlling method of claim 7, further comprising:

in response to determining that the meaning of the text is not analyzable, determining an operation of a search using the text as a keyword, as the control operation.]

[9. The method of claim 1, wherein the plurality of different determination criteria further comprise criteria of whether the text is grammatically analyzable, and whether the text refers to a keyword.]

[10. A display apparatus comprising:

a voice input circuit configured to receive a voice of a user;

a voice converter configured to convert the voice into text;

a storage configured to store a plurality of determination criteria that are different from one another; and a controller configured to determine a control operation corresponding to the text by sequentially applying a plurality of different determination criteria to the text, and perform the control operation, wherein the plurality of different determination criteria comprise criteria of whether the text corresponds to a title of an object displayed on a screen of the display apparatus, and whether the text corresponds to a stored command, a criterion of whether the text corresponds to a title of an object displayed on a screen of the display apparatus being applied before a criterion of whether the text corresponds to a stored command, and wherein the controller is further configured to determine whether the text corresponds to the title of the object, determine the control operation based on the object in response to determining that the text corresponds to the title of the object, determine whether the text corresponds to the stored command in response to determining that the text does not correspond to the title of the object, and determine an operation corresponding to the stored command as the control operation in response to determining that the text corresponds to the stored command.]

[11. The display apparatus of claim 10, wherein the controller is further configured to, in response to determining that the text corresponds to the title of the object, determine an operation corresponding to the object as the control operation.]

[12. The display apparatus of claim 10, wherein the controller is further configured to, in response to only a part of the title of the object being displayed and determining that the text corresponds to the part of the title of the object being displayed, determine that the text corresponds to the title of the object.]

[13. The display apparatus of claim 10, wherein the controller is further configured to, in response to only a part of one word included in the title of the object being displayed and determining that the text corresponds to the whole one word, determine that the text corresponds to the title of the object.]

[14. The display apparatus of claim 10, wherein the object comprises at least one of a content title, an image title, a text icon, a menu name, and a number that are displayed on the screen.]

[15. The display apparatus of claim 10, wherein the stored command comprises at least one of a command for controlling power of the display apparatus, a command for controlling a channel of the display apparatus, and a command for controlling a volume of the display apparatus.]

[16. The display apparatus of claim 10, wherein the controller is further configured to, in response to determining that the text does not correspond to the stored command, determine whether a meaning of the text is analyzable, and, in response to determining that the meaning of the text is analyzable, analyze the meaning of the text and determine an operation of displaying a response message corresponding to the analysis result, as the control operation.]

[17. The display apparatus of claim 16, wherein the controller is further configured to, in response to determining that the meaning of the text is not analyzable, determine an operation of a search using the text as a keyword, as the control operation.]

*18. A display device comprising:*

*a display;*

*a voice receiving unit configured to receive a voice input from a user; and*

*at least one processor configured to:*

*control the display to display at least one object on a screen of the display;*

*receive, via the voice receiving unit, the voice input while the at least one object is displayed on the screen of the display;*

*obtain text resulting from processing the received voice input;*

*identify an operation of the display device corresponding to the voice input based on whether the obtained text corresponds to text that is displayed on the screen of the display and associated with any of the at least one object displayed on the screen of the display and whether the obtained text matches any of instructions for controlling the display device;*

*based on identifying that the obtained text corresponds to the text that is displayed on the screen of the display and associated with an object displayed on the screen of the display, control the display to display a content corresponding to the object displayed on the screen of the display. the object including a thumbnail image indicating the content, wherein the text that is displayed on the screen of the display and associated with the object is at least a portion of a title of the content; and*

*based on identifying that the obtained text does not correspond to text that is displayed on the screen of the display and associated with any of the at least one object displayed on the screen of the display and that the obtained text matches an instruction among the instructions for controlling the display device, perform an operation of the display device corresponding to the obtained text by executing the instruction, and control the display to display, on the screen of the display, a user interface indicating a result of performing the operation of the display device corresponding to the obtained text together with the at least one object,*

*wherein the at least one processor is further configured to identify whether the obtained text corresponds to text that is displayed on the screen of the display and associated with any of the at least one object before identifying whether the obtained text matches any of the instructions.*

*19. The display device of claim 18,*

*wherein the at least one processor is further configured to, in response to the obtained text corresponding to the text that is displayed on the screen of the display and associated with the object of the at least one object displayed on the screen of the display obtain first control information for displaying the content irrespective of whether the text matches any of the instructions for controlling the display device.*

*20. The display device of claim 19,*

*wherein the at least one processor is further configured to:*

*in response to the obtained text not corresponding to text that is displayed on the screen of the display and associated with any of the at least one object displayed on the screen of the display and matching the instruction among the instructions for controlling the display device, obtain second control information for executing the operation.*

*21. The display device of claim 20,*

*wherein the at least one processor is further configured to:*

*transmit the voice input to a first server connected to the display device; and*

*receive text corresponding to the transmitted voice input from the first server.*

*22. The display device of claim 21,*

*wherein the first control information and the second control information are obtained from a second server connected to the display device and the first server.*

*23. The display device of claim 18,*

*wherein the display device further comprises a microphone, and*

*wherein the voice input of the user is received through the microphone.*

*24. The display device of claim 18,*

*wherein the voice input of the user is received from a remote control device for controlling the display device.*

*25. A method of a display device, comprising:*

*displaying at least one object on a screen of a display;*

*receiving a voice input while the at least one object is displayed on the screen of the display;*

*obtaining text resulting from processing the received voice input;*

*identifying an operation of the display device corresponding to the voice input based on whether the obtained text corresponds to text that is displayed on the screen of the display and associated with an object among the at least one object displayed on the screen of the display and whether the obtained text matches any of instructions for controlling the display device;*

*based on identifying that the obtained text corresponds to the text that is displayed on the screen of the display and associated with the object displayed on the screen of the display, controlling the display to display a content corresponding to the object displayed on the screen of the display, the object including a thumbnail image indicating the content, wherein the text that is displayed on the screen of the display and associated with the object is at least a portion of a title of the content; and*

*based on identifying that the obtained text does not correspond to text that is displayed on the screen of the display and associated with any of the at least one object displayed on the screen of the display and that the obtained text matches an instruction among the instructions for controlling the display device; performing an operation of the display device corresponding to the obtained text by executing the instruction; and controlling the display to display, on the screen of the display, a user interface indicating a result of*

*performing the operation of the display device corresponding to the obtained text together with the at least one object,*

*wherein identifying whether the obtained text corresponds to text that is displayed on the screen of the display and associated with any of the at least one object is performed before identifying whether the obtained text matches any of the instructions.*

*26. The method of claim 25,*

*wherein the controlling the display to display the content comprises, in response to the obtained text corresponding to the text that is displayed on the screen of the display and associated with the object of the at least one object displayed on the screen of the display device, obtaining first control information for displaying the content irrespective of whether the text matches any of the instructions for controlling the display device.*

*27. The method of claim 26,*

*wherein the controlling the display to display the content further comprises:*

*in response to the obtained text not corresponding to text that is displayed on the screen of the display and associated with any of the at least one object displayed on the screen of the display device and matching the instruction, obtaining second control information for executing the operation.*

*28. A computer readable medium which includes a program for executing a method of a display device, comprising:*

*receiving a voice input while at least one object is displayed on a screen of a display;*

*obtaining text resulting from processing the received voice input;*

*identifying an operation of the display device corresponding to the voice input based on whether the obtained text corresponds to text that is displayed on the screen of the display and associated with an object among the at least one object displayed on the screen of the display and whether the obtained text matches any of instructions for controlling the display device;*

*based on identifying that the obtained text corresponds to the text that is displayed on the screen of the display and associated with the object displayed on the screen of the display, controlling the display to display a content corresponding to the object displayed on the screen of the display, the object including a thumbnail image indicating the content, wherein the text that is displayed on the screen of the display and associated with the object is at least a portion of a title of the content; and*

*based on identifying that the obtained text does not correspond to text that is displayed on the screen of the display and associated with any of the at least one object displayed on the screen of the display and that the obtained text matches an instruction among the instructions for controlling the display device, performing an operation of the display device corresponding to the obtained text by executing the instruction; and controlling the display to display, on the screen of the display, a user interface indicating a result of performing the operation of the display device corresponding to the obtained text together with the at least one object,*

*wherein identifying whether the obtained text corresponds to text that is displayed on the screen of the display and associated with any of the at least one object is performed before identifying whether the obtained text matches any of the instructions.*

* * * * *